United States Patent Office
3,429,343
Patented Feb. 25, 1969

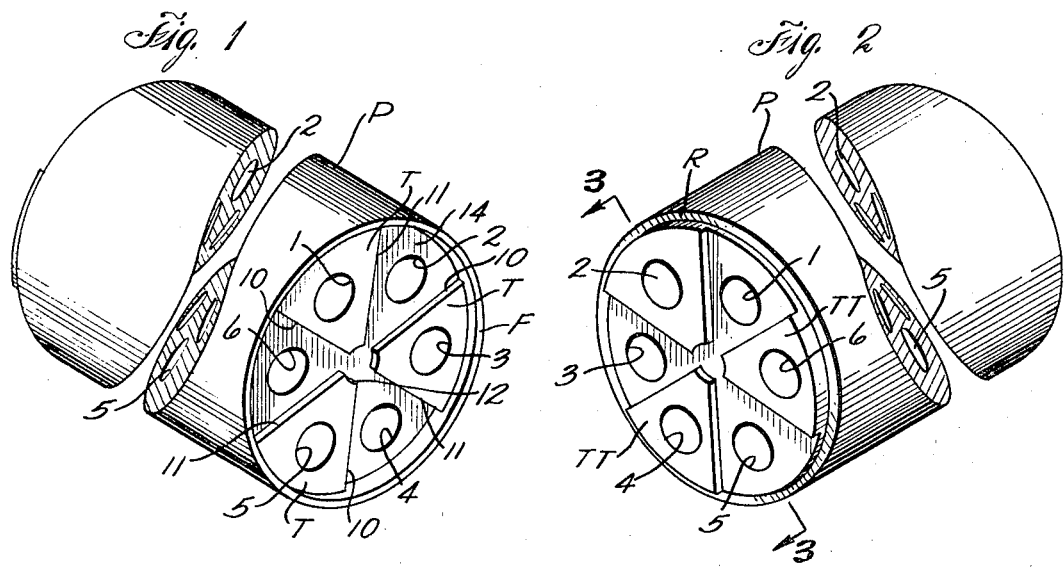
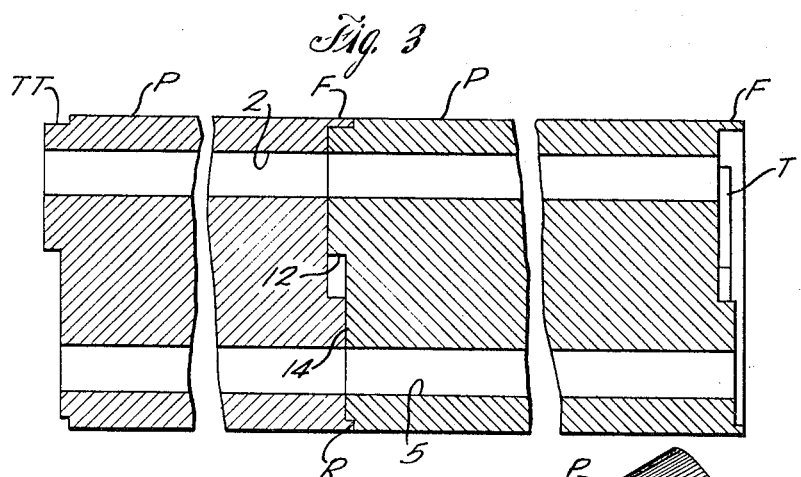
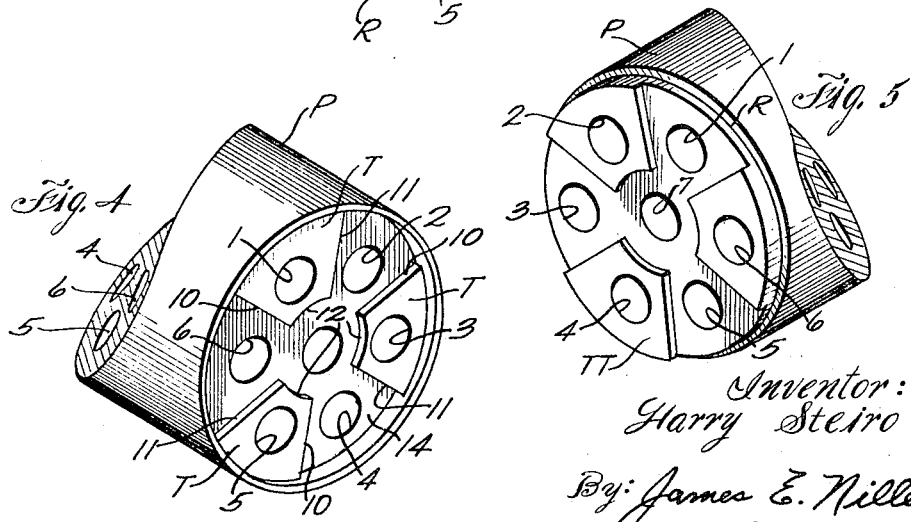

3,429,343
MULTIPLE DUCT CONCRETE PIPE
Harry Steiro, 3725 Lexington Ave.,
Madison, Wis. 53700
Filed Jan. 27, 1967, Ser. No. 612,262
U.S. Cl. 138—155
Int. Cl. F16l 9/20, 39/00, 25/00
6 Claims

ABSTRACT OF THE DISCLOSURE

Concrete pipe having a plurality of separate ducts extending therethrough for underground electrical power lines or the like.

Background of the invention

The invention pertains to concrete pipe that is made in lengths which fit together by bell and spigot ends. This pipe has a plurality of separate conduits or ducts through which the power lines are strung. Pipe of this type has been used widely in underground electrical power systems but it has not proved altogether satisfactory for several reasons. For one thing, the sections have been difficult to properly align and connect in the trench so as to form a watertight joint and insure alignment of the individual duct, and easy stringing of the electrical wires without damage. Such an example of the prior art is to be found in the U.S. Patent 259,045 issued on June 6, 1882, to Richardson. Another difficulty has been in the attendant damage to the relatively fragile end projections of the sections which form the interlocking joints, as is found in the U.S. Patent 401,155, issued April 9, 1889, to Gillette, or in Patent 376,562 issued on January 17, 1888, to Buren et al. The joint itself has not always been of waterproof design and which would prevent electrical shorting through the joint from one duct to the other.

Summary of the invention

The multiple duct, concrete pipe sections provided by the present invention insure accurate, quick and easy alignment of the complementary ends of the sections so as to form a tight and sound joint. The ends of the sections are so formed that they can withstand the rough handling to which they are frequently subjected, without breakage of the end portions which are supposed to form the waterproof joint. The joints provided by pipe sections made in accordance with the present invention permit ready stringing of the electrical cables therethrough, after the pipe has been laid.

These and other objects and advantages of the present invention will appear hereinafter as this disclosure progresses.

Brief description of the drawing

FIGURE 1 is a perspective view of one end of a pipe section made in accordance with the present invention; the section also being shown as broken away and in section intermediate its length;

FIGURE 2 is a similar perspective view of the other end of a section shown in FIGURE 1, FIGURE 3 is a longitudinal cross sectional view through the center of a pipe joint formed by two of the sections shown in FIGURES 1 and 2;

FIGURE 4 is a fragmentary, perspective view of a modified form of the invention; and FIGURE 5 is a view similar to FIGURE 4 but of the opposite end of a section shown in FIGURE 4.

Description of the preferred embodiments

The concrete pipe sections are formed of no slump concrete and comprises a main body P having an even plural number of ducts 1, 2, 3, 4, 5 and 6 extending therethrough. These ducts are equally spaced circumferentially around the body and extend all the way through the axial length of the sections.

Other numbers of ducts may be used in the pipe sections and furthermore the ducts themselves may be larger or smaller relative to the diameter of the entire pipe, than that shown. It will also be appreciated the pipe may be of relatively small diameter or in some installations, pipe diameter of several feet may be required.

The right hand end of the pipe shown in FIGURE 1 will be referred to as the bell end. The opposite end, as shown at the left end of FIGURE 2 will be referred to as the spigot end because it fits generally within the bell end of an adjacent section.

The modification shown in FIGURES 4 and 5 is generally the same as those shown in FIGURES 1 and 2 and in addition have a central duct 7 which may be used simply to reduce the weight of the section, or it may be relatively small, say only two inches in diameter, for carrying a ground wire.

As to relative sizes involved, practice has indicated that for a common underground installation, preferable dimensions are that the outside diameter of the pipe would be 24 inches, the ducts five inches in diameter, with about one and one-half inches being required between the ducts.

The interior surfaces of the ducts must be smooth in order that utility lines can be readily pulled through long completed runs of the installed pipe, and the joints between the pipe lengths must also be free of any projections or rough edges. For example, if the edges of the joints were rough or broken, or if there were broken pieces of concrete within the finished pipe, the lead sheathing on the electrical cables would be torn or mutilated by these sharp edges as the cables were pulled through the pipe line.

As shown in FIGURES 1 and 4, at the bell end of the pipe sections, a generally pie-sector shaped tongue T is formed around each of alternate ducts 1, 3, and 5. These tongues include the two radially extending side walls 10 and 11 which are connected at their inner ends by the generally arcuate wall 12. These tongues extend a short distance axially beyond the ends of the other adjacent ducts 2, 4 and 6 which terminate in the inner, flat surface 14; thus the ends of ducts 2, 4 and 6 at the bell end terminate in generally pie-sector shaped recesses located between the tongues. An axially extending, peripheral flange F extends around the bell end of the pipe section and is generally longer in axial length than the tongues T.

At the other end of the pipe sections, namely the spigot ends as shown clearly in FIGURES 2 and 5, the alternate ducts 2, 4 and 6 have tongues TT around each of their ends which are complementary to the recesses at the other end of the pipe section. Ducts 1, 3 and 5 at the spigot end of the pipe section terminate in recesses which are complementary to the tongues T at the bell end of the pipe section.

Also formed on the spigot end of the pipe section is a peripheral recess R which is complementary to the flange F at the opposite end of the pipe section.

When two pipe sections are assembled as shown in FIGURE 3, the tongues at one end of a section are snugly received by the complementary recesses on the adjacent end of the adjoining section of pipe, and flange F is received by the recess R.

With the pipe formed by the present invention, there are no fragile or inherently weak tongues or other projections but instead the tongues are of sturdy cross section and able to withstand rough handling. Similarly, neither the peripheral flange F nor recess R are susceptible to breakage.

The sections fit accurately and easily together in a foolproof manner, and are easily aligned even when being assembled at the bottom of a trench in close quarters.

The ends of the pipes and ducts are formed "square" or normal to the pipe axis which insure exact alignment of the duct openings and alignment of the finished line of pipes. With the present joints, the duct openings can be aligned between pipe sections within one-sixteenth of an inch.

In laying this pipe, the surfaces at one end of a section would be "buttered" with mortar, it being unnecessary to apply mortar on the other tongues and grooves. The jointing mortar cannot work its way inwardly to the inferior surfaces of the ducts because of the repeated changes in direction which are present due to the tongues and grooves at the ends of the pipe sections. It is therefore unnecessary to subsequently clean or wipe mortar from the interior of the ducts as each pipe section is added.

When installed, each duct is isolated from the other, and no common plane exists between the ducts. Flash over between the ducts with consequent short out is eliminated. Damage to relatively thin sectioned, interengaging and complementary parts of the pipes has been substantially eliminated by means of the present invention.

I claim:

1. A pre-cast concrete pipe section having a main body of generally circular cross section formed of no-slump concrete and with an even plural number of ducts extending axially therethrough and in circumferentially spaced relationship, said section having a bell end and an opposite spigot end, said bell end of said pipe section having a generally pie-sector shaped tongue around circumferentially alternate ducts and extending axially beyond the other adjacent ducts, said other adjacent ducts terminating at said bell end in a generally pie-sector shaped recess; said spigot end of said pipe having recesses around the ends of said alternate ducts which are complementary to said tongues at said bell end of said alternate ducts, said spigot end also having a generally pie-sector shaped and axially extending tongue around the end of each of said adjacent ducts which are complementary to pie-sector shaped recesses at said bell end.

2. The pipe section set forth in claim 1 further characterized in that said bell end has an axially extending peripheral flange therearound and being generally longer in axial length than said tongue at said bell end.

3. The pipe section as defined in claim 2 further characterized in that said spigot end of said pipe section has a peripheral recess which complements said peripheral flange at the bell end.

4. A pre-cast concrete pipe section of the type having a main body of generally circular cross section formed of no-slump concrete and with an even plural number of ducts extending axially therethrough and in circumferentially spaced relationship, said section having a bell end and an opposite spigot end, the improvement comprising: said bell end of said pipe section having a tongue located around circumferentially alternate ducts and extending axially beyond the other adjacent ducts, said other adjacent ducts terminating at said bell end in a generally pie-sector shaped recess; said spigot end of said pipe having recesses around the ends of said alternate ducts which are complementary to said tongues at said bell end of said alternate ducts, said spigot end also having an axially extending tongue around the end of each of said adjacent ducts which are complementary to said pie-sector shaped recesses at said bell end, said tongues each having two radially extending side walls.

5. The pipe section set forth in claim 4 further characterized in that said bell end has an axially extending peripheral flange therearound and being generally longer in axial length than said tongue at said bell end.

6. The pipe section as defined in claim 5 further characterized in that said spigot end of said pipe section has a peripheral recess which complements said peripheral flange at the bell end.

References Cited

UNITED STATES PATENTS

| 221,127 | 10/1879 | Walker | 138—155 X |
| 259,045 | 6/1882 | Richardson | 138—115 X |
| 401,155 | 4/1889 | Gillette et al. | 138—114 |
| 703,477 | 7/1902 | McGowan | 285—137 X |
| 987,398 | 3/1911 | Potter | 138—115 |
| 1,899,861 | 2/1933 | Gackenbach | 285—137 |
| 2,473,909 | 6/1949 | Ruchti | 285—330 |

ALFRED R. GUEST, *Primary Examiner.*

U.S. Cl. X.R.

285—137, 330; 138—115